Sept. 5, 1967  D. S. FIELDS, JR., ETAL  3,340,101
THERMOFORMING OF METALS
Filed April 2, 1965  2 Sheets-Sheet 1

INVENTORS.
DAVIS S. FIELDS, JR.
DANIEL L. MEHL
BERNARD F. ADDIS

BY  E. Ronald Coffman
ATTORNEY.

Sept. 5, 1967  D. S. FIELDS, JR., ET AL  3,340,101

THERMOFORMING OF METALS

Filed April 2, 1965  2 Sheets-Sheet 2

United States Patent Office 3,340,101
Patented Sept. 5, 1967

3,340,101
THERMOFORMING OF METALS
Davis S. Fields, Jr., Daniel L. Mehl, and Bernard F. Addis, Lexington, Ky., assignors to International Business Machines Corporation, Armonk, N.Y., a corporation of New York
Filed Apr. 2, 1965, Ser. No. 445,188
13 Claims. (Cl. 148—11.5)

ABSTRACT OF THE DISCLOSURE

Sheet stock of metallic alloys having significant strain-rate sensitivity is stretched substantially in excess of 100% of its original surface area under tensile stress, even when such stress is induced non-uniformly by interaction of the sheet with a forming die.

Specification of invention

We have discovered that well-known thermoforming techniques now practiced in the polymer and glass industries can be employed with equal or greater facility to the shaping and deforming of metals characterized herein as hyperextensible and identifiable by the presence of a substantial strain rate sensitivity.

The plastic and glass industries have possessed many processes for stretching or tensile deforming various polymers, silicates and like non-metallic material. The basic process employed involves ordinarily a die having a shape that is substantially complementary to the shape desired to be produced; the material to be deformed is placed adjacent the die and deforming force is applied causing the material to stretch and deform into and/or around the die, including such detailed contours and complex curvatures as may be required. As there are many variations on this basic theme, all of which are well known to those working in the specific industries mentioned, it is unnecessary to describe such processes in elaborate detail. Attention is called, however, to a survey article, "Thermoforming Today," by Lowell L. Scheiner, published in Plastics Technology, volume No. 10, No. 8, August 1964, pages 45–56, which article illustrates many of the processes presently employed.

In an article entitled "A Review of Superplasticity and Related Phenomena" by Ervin E. Underwood, published in the Journal of Metals, December 1962, pages 914–919, a phenomenon recently termed superplasticity in metals is reviewed. Superplasticity in metals has been recognized for over forty years and concentrated study of this phenomenon has been conducted principally during the past ten years. Underwood's article is principally directed to various attempts to explain or predict this phenomenon which is characterized as having "especially low values of resistance to deformation and extremely high plasticity as compared with other alloys and pure components of a system." Elongations in the neighborhood of 600% were specifically noted, as indicative of a high degree of plasticity. In particular, the following metals were designated as being conditionable to exhibit superplastic properties. The superplastic properties are seen to diminish moderately rapidly as the metallic composition varies from the stated ideal, and as the testing temperature is varied from the ideal (percentages are by weight):

| | |
|---|---|
| 20% aluminum | 80% zinc |
| 67% aluminum | 33% copper |
| 88.3% aluminum | 11.7% silicon |
| 62% copper | 38% zinc |
| 59% copper | 41% zinc |
| 52% copper | 48% zinc |

In a more recent article, "Superplasticity in an Aluminum Zinc Alloy," by W. A. Backofen, I. R. Turner and D. H. Avery, published in Transactions of the ASM, volume 57, 1964, pages 980–990, the extensibility of a particular superplastic alloy was investigated to demonstrate the hypothesis that the extraordinary elongation without failure was explainable on the basis of strain rate sensitivity, a property ordinarily not possessed in any significant amount by metals. Photographs are shown of an extended tensile test specimen and a bulge test specimen which demonstrate the ability of the material to deform large amounts under, respectively, uniaxial and biaxial loading. The success of the experiments performed in demonstrating the hypothesis lead the authors to make a reserved conjecture as to the possibility of "applying to superplastic metal forming techniques borrowed from polymer and glass processing." No such application of any polymer or glass processing techniques was made employing superplastic metals, however, and accordingly this article does not constitute a part of the prior art.

In fact, prior to our discovery not a single person in the world has ever successfully deformed by tension any metal against a die that requires either overall or local increase in surface area of more than 100%.

We have, in fact, deformed sheet metal stock having a cross-section of 0.1 inch, as hereinafter explained, into a die producing an overall increase in surface area of 260%, and under the influence of a pressure differential less than 15 p.s.i. We have further, by actual manufacture performed, caused sheet metal stock to be deformed into and around intricate die patterns comparable to those employed in the polymer and glass industries, and have duplicated the more significant variations on the basic thermoforming theme to the point that it is possible to generalize with ordinary engineering certainty that metals conditionable to possess or exhibit an effective strain rate sensitivity can be extended in extraordinarily large amounts in the presence of vastly non-uniform induced stress as required to employ the various forming techniques "borrowed from polymer and glass processing."

The first successful reduction of these new metal forming processes to practice is the basis of this invention.

Accordingly, the principal object of our invention has been to successfully deform sheet metal against and into intimate contact with a die having a surface area extraordinarily greater than the original surface area of the sheet.

Another object of our invention has been to successfully deform sheet metal into intricate patterns requiring extremely high local increases in surface area.

Another important object of our invention has been to successfully perform on sheet metal, the principal variations of the basic thermoforming process now employed in the polymer and glass forming industries.

A further object of our invention has been to positively determine the criteria by which routine experimentation can predict whether, and to what extent, a particular metal is capable of use in our process.

These and other objects of the foregoing invention will be apparent to those skilled in the art from the following description of our discovery, its application and performance, and some specific examples thereof.

Briefly, the process which we have discovered involves the provision of stock sheet-like material of a metal (including alloys) having the ability to exhibit an effective strain rate sensitivity under the proper conditions, bringing the metal to a state wherein it exhibits its effective strain rate sensitivity, and inducing tensile deforming stresses in the material by applying a load through a fluid interface to deform the material against a die having a shape that is substantially complementary to the shape desired to be formed. Our process is characterized by a definite and substantial relationship between the stress inducing applied load and the rate at which deformation occurs, i.e., extremely small loadings can produce the entire deformation if one is willing to wait a sufficient amount of time, and significantly less time is required at increased load levels. The process is also characterized by a predictable relationship between the degree of total available deformation, i.e., surface area increase, the strain rate sensitivity of the material being formed, and the permissible variation in thickness throughout the part. For example, metals having a strain rate sensitivity of 0.6 can be expected to undergo greater increases in surface area with less variation in thickness than metals having a strain rate sensitivity of 0.1; however, all such metals are deformable in accordance with the load time relationship indicated above. A strain rate sensitivity of about 0.3 or greater can be expected to satisfactorily produce remarkably complex shapes; however, lower values are effective to satisfactorily undergo less severe deformation.

Before elaborating on the process which we have discovered, it is helpful first to clearly identify it and indicate its significance by pointing out what it is not, in relation to existing metal forming processes.

This discovery is not an indirect compression process, such as "deep drawing," which is ordinarily characterized by an absence of change in actual surface area and cross-sectional thickness.

This discovery is not a conventional "stretch forming" process which involves biaxial tensile deformation which is always characterized by a significantly low increase in surface area (100% max. without intermittent annealing or multiple steps including tooling changes).

Both "deep drawing" and "stretch forming" are also characterized by an absence of any relationship between the induced stress and the rate of deformation, except for acceleration, which is not significant.

This discovery is not "explosive forming" by which greater than ordinary increases in surface area are achieved by inducing an extraordinarily high expanding momentum in the metal. "Explosive forming" is characterized by deformation speeds approaching the speed of sound in the material and by a complete inability to form any curvature requiring the material to move in any direction other than that of its initial momentum.

This discvoery is not "creep forming" by which metal at high temperature is allowed to "creep" extremely small amounts into its final shape for the purpose of inducing a particular internal metallurgical structure in the metal. "Creep forming" is characterized by the very small dimensional changes which are obtainable prior to failure.

Returning to our discovery, those skilled in the art will recognize that actual performance of our process can be reproducibly accomplished by the following approach which requires a degree of experimentation that is routine once the approach is known, coupled with the fact that we have conclusively proven feasibility of the ultimate goal.

In disclosing the best mode of performing the process of our discovery, presently contemplated by us, specific reference is made to the accompanying drawings, of which:

First, it is necessary to determine a material that is suitable for use in our process and also compatible with the requirements of the finished shape, such as its strength, resistance to corrosion, etc.

There are several approaches for determining appropriate metals; for example, many materials are disclosed in the published literature like those listed hereinabove taken from the Underwood article as having hyperextensibility or the ability to undergo extra large extension without necking failure. Also, materials of eutectic or eutectoid composition and allotropic metals have some significant likelihood of exhibiting "hyperextensibility." The extent to which any material so selected can be extended is predictable in general terms from a determination of its strain rate sensitivity and a design determination of the permissible variation in wall thickness. Strain rate sensitivity can be defined as $m$, wherein $$m = \frac{d \ln \sigma}{d \ln \dot{\epsilon}}$$

and $\sigma$ is stress in lbs. per sq. inch, and $\dot{\epsilon}$ is strain rate in reciprocal minutes. Strain rate sensitivity is readily determined by a simple and now well recognized torsion test described in the article "Determination of Strain-Hardening Characteristics by Torsion Testing," by D. S. Fields, Jr., and W. A. Backofen, published in the Proceedings of the ASTM, 1957, volume 57, pages 1259–1272, or by a tensile test as performed by Backofen et al., supra. Maximum strain rate sensitivity in metals is seen to occur, if at all, as metals are deformed while in a metastable state near the phase transformation boundary. Accordingly, the temperature immediately below the temperature boundary between the phases in question can be expected to produce the greatest strain rate sensitivity. This temperature is thus preferred for testing and processing. Having chosen a material having effective strain rate sensitivity, that is a strain rate sensitivity which is compatible with the desired degree of deformation and permissible thickness variation, it is necessary to provide a die that is complementarily shaped with respect to the desired form to be produced.

Figure 1:
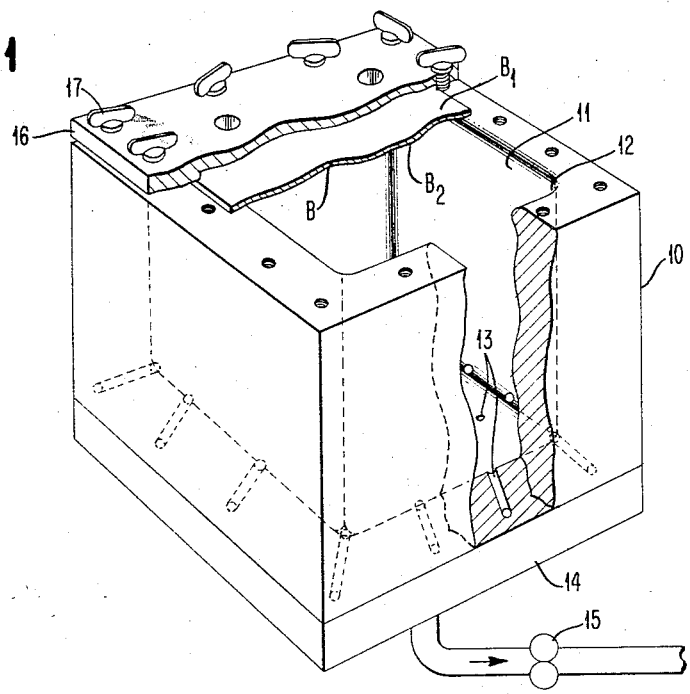
FIGURE 1 is a perspective view of a typical apparatus employed in performing one basic application of our process and is partially broken away to show internal details.

Typical basic apparatus is shown in FIGURE 1 and includes a die body 10 defining a female die surface or shaping member 11 formed complementary to the shape desired to be formed and preferably is provided with relief radii 12 at the edges and corners or other surface intersections. The die surface 11 is provided at corners and edges and along the bottom with vents or bleed holes 13 preferably each having a diameter that is small with respect to the thickness of the material coming in contact therewith. A vacuum manifold 14 connected to suitable pump means 15 is provided beneath the die body 10 for evacuating the cavity of die surface 11 to apply a fluid pressure loading across blank metal B. It will be appreciated that deforming pressure could be provided by the application of positive pressure on the blank metal B with equally successful results. The important factors in loading the blank are: (1) the provision of venting means wherever female shaping member contours are likely to result in entrapped space by the blank, either initially or as it moves; and (2) the loading during at least some portion of the process be applied through a fluid interface.

Clamping or periphery constraining means 16 is employed to grip and effectively constrain a single continuous edge of the blank metal B to assure that the final part will be stretched rather than drawn. The blank metal B shown in FIGURE 1 is in the form of a sheet having upper and lower principal opposed surfaces $B_1$ and $B_2$, respectively. Tightening means shown conveniently as wing bolts 17 are provided for securing the clamping means 16 to the die body 10. The clamping means 16 is shown as a perforated plate, covering most of the blank metal B to minimize heat transfer therefrom. In vacuum processes it is ordinarily desirable to surround the die body with heating means for the same purpose. However, such heating is not essential to the more general application of our process since the blank metal can be deformed at a sufficiently high rate, as compared to the rate of heat transfer therefrom, that continued addition of heat or direct prevention of heat transfer is not required.

Figure 2:
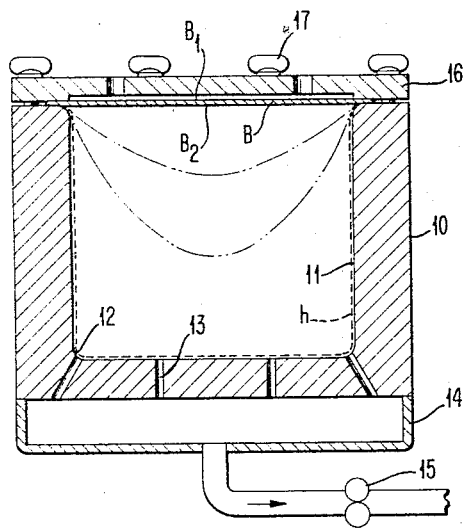
FIGURE 2 is a cross-sectional elevational view of the apparatus shown in FIGURE 1; and illustrates both the original position of the metal to be formed and the final position of the metal as formed.
Figure 3:
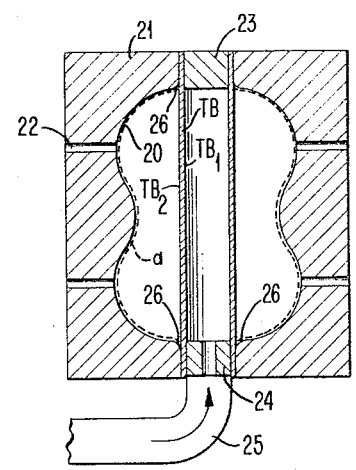
FIGURE 3 is a cross-sectional elevational view of modified apparatus showing typical apparatus as may be employed in forming tubular stock.

FIGURE 3 shows apparatus for forming tubular blank metal stock TB, having inner and outer principal opposed surfaces $TB_1$ and $TB_2$, respectively, into the expanded contour of die surface or shaping member 20 formed in a die body 21. The shaping member 20 is provided with vents or bleeds holes 22 in the female sections as described in connection with FIGURES 1 and 2. One end of the tubular blank metal TB, defining a first continuous edge thereof, is clamped against the die body 21 and blocked against fluid transmission by a plug member 23. The opposite end of the tubular blank metal TB, defining a second continuous edge thereof, is also clamped against the die body 21 by a plug member 24, but fluid communication therethrough is provided for the introduction of a fluid pressure loading from a suitable source (not shown) attached to conduit 25. Again, it will be recognized that the fluid pressure loading on the blank metal TB could be induced by a vacuum shroud around the die body 21 and an atmospheric vent to the interior of the tubular blank metal. It will be noted that the constrained two separate continuous edges of the tubular blank TB define a closed periphery circumscribing that portion of the surface area of the blank TB which is in lateral operative projection with the die surface or shaping member 20. The shaping member 20 adjacent the plug members 23 and 24 is provided with relief radii 26 to minimize initial stress concentrations. The final shape of the part formed by the apparatus of FIGURE 3 is shown by broken line $a$.

Figure 5:
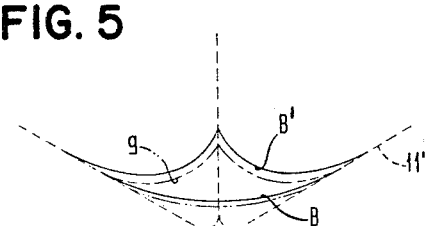
FIGURE 5 is an explanatory perspective view of a typical female die part shown in broken lines to illustrate a further principle of our discovery.
Figure 4:
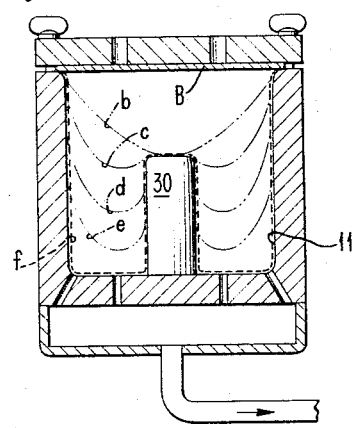
FIGURE 4 is an explanatory vertical cross-sectional view showing a typical male die part in a female cavity, and illustrating a principle of our discovery.

It will be seen that the apparatus thus far described deals principally with female die sections or cavities. FIGURES 4 and 5 illustrate a geometric principle of our discovery showing that the most critical area of metal forming into a die is encountered in such female sections.

In FIGURE 4 a severe male die surface shaping member 30 is mounted in a basic female die surface 11 of apparatus essentially similar to that shown in FIGURES 1 and 2. Blank metal B is shown in full illustrating its original configuration. Movement line $b$ shows the blank B as it first encounters the male shaping member 30. Further movement of the blank into the die is shown by movement lines $c$, $d$ and $e$. The final shape of the part thus formed is as shown at $f$ by a broken line. Friction between the blank metal and the die surfaces 30 and 11 inhibits motion of contacting metal causing deformation to be concentrated in the non-contacting metal portions. It is apparent from FIGURE 4 that the metal in positions $c$, $d$, $e$ and $f$ is effectively encountering a female die section in spite of the fact that a male shaping member 30 was employed.

Female die sections represented the most severe forming operation encountered in our process, as illustrated in FIGURE 5 where a typical corner section 11' of a die surface or shaping member is shown in phantom lines along with a blank metal portion B. The blank metal portion B intersects the corner section 11' at a closed periphery. The periphery B' decreases that circumscribing an area of blank metal B smaller than the remaining die surface as the material moves into the corner as indicated by movement line $g$, thus effectively decreasing the gauge length over which increase in area can be distributed. Friction between the metal at and beyond the intersection B' effectively constrains the material to concentrate deformation in that area not in contact with the die surface. Experiment has shown that local deformation into such a corner area can require and be accommodated by a local total increase in area in excess of 1200%.

It will be appreciated by those skilled in the art that the performance of our discovered process is not dependent on any specific die configuration, and accordingly the best mode presently contemplated by us for performing our discovery and process can be discussed with reference to the basic structure of FIGURES 1 and 2 without limitation thereto.

The steps of our process thus far described have involved the provision of an appropriate material and the provision of appropriate apparatus for operating thereon. Full performance of our discovered process requires that the metal blank be heated or otherwise conditioned to exhibit its effective strain rate sensitivity as indicated above and placed in the apparatus provided in operative projection with an opposed die portion. Tensile deforming stress is then induced in the blank by application of a load through a fluid pressure interface. The time required for load application is dependent upon the load applied, which represents a significant characteristic in comparison with known metal working processes. Loading is continued until the blank has deformed against and into intimate contact with the shaping member or die surface 11 as shown by broken line $h$.

Although not essential to our process, we prefer to eliminate any remaining metastability in the part thus formed to assure full strength at all expected temperatures and loading conditions. For temperature dependent metastable state, this further conditioning is easily accomplished by heating the part into a stable phase and allowing the part to cool slowly, thus permitting transformation to its low temperature stable phase. Of course, this final conditioning process is not available where eutectic alloys are involved, as the upper stable phase is liquid.

It will be appreciated by those skilled in the art that our process as described above need not always be an entire process, that is, the starting point for the blank can come after preliminary operations have occurred. The constraint of a periphery, for example, to induce stretching rather than drawing, is as readily accomplished by the friction between the blank and the sidewalls as by external clamping means. External operation required to effect such frictional constraining is the movement of material into and against the die wall which may be accomplished by this or other processes.

Having described a preferred operation of our discovered process, we demonstrate our discovery and its generality by the following experimental examples.

(I)

The strain rate sensitivity of a zinc-aluminum alloy (78% zinc, 22% aluminum by weight) near that studied by Backofen et al. supra was explored at higher deformation rates, using the accepted torsion test on specimens that had been cast in chill molds, machined, solution heat treated at 600° F., and water quenched to produce the metastable state required for potential hyperextensible behavior. The object of the torsion test was to determine the variation of strain rate sensitivity $m$ and flow stress with temperature and strain rate. Deformation speeds were varied in a range yielding surface shear strain rates from 0.35 to about 125 minutes$^{-1}$, and over a range of temperatures near the eutectoid invarient 525° F. Test data confirmed the high strain rate sensitivity reported by Backofen et al. near 520° F., and showed the effect to persist at much higher strain rates than were considered by Backofen. Our tests showed the strain rate sensitivity to vary between 0.4 and 0.6.

(II)

Samples from the same zinc-aluminum alloy were chill cast and homogenized, then hot-rolled to 6 inch wide sheet having a thickness of 0.030 inch. Metallographic examination assured that the material was homogeneous and of eutectoid composition. The blank metal sheet thus prepared was solution heat-treated at one hour at 600° F. and water quenched to produce the metastable state as in the case of the torsion specimen. A small vacuum forming apparatus was built substantially like that shown in FIGURES 1 and 2. The die surface 11 was dimensioned nominally at 2½" wide by 5½" long by 2½" deep. The die cavity was designed such that a successful deformation would result in an increase in the overall surface area of the sheet greater than 200%. This represents a severe stretching operation, even for sheet thermoforming of polymer sheet stock. The clamping means 16 effectively constrained the periphery of the blank. To assure uniformity, for test purposes, heating means (not shown) were provided surrounding the die body 10. The remote corner portions of the die were rounded using ¼" relief radii and vented by ports or bleed holes of ¹⁄₁₆" and ¹⁄₃₂". A suction pump 15 was connected to the die body 10 through the bleed holes to effect the application of loading vacuum to the work piece. The vacuum system applied a uniform load normal to the surface of the metal blank of approximately 14 p.s.i.

The vacuum was applied and maintained for four minutes, during which time the metal blank deformed down and into the die cavity and into intimate contact with the die surface 11. It was noted that the mating surface of the deformed blank showed a tendency to take the surface polish of the die, indicating the intimacy of the contact therebetween. It was noted further from this example that the metal tended to deform into the vent holes, indicating its extreme plasticity. Accordingly, it was determined that the vent holes should have a diameter less than the thickness of the material reaching their location, to minimize material flow thereinto.

The parts formed using the basic apparatus were examined for variation in area increase. A typical example having an initial thickness of 0.095 inch before the test, had a maximum change in excess of 12 to 1. Incidentally, this maximum occurred in the corner of the die as expected from the analysis of FIGURE 5. This increase was determined by scribing a grid on the blank before forming and comparing the area change in various locations.

Identical tests were performed employing stock varying in sheet thickness from 0.025 inch to 0.180 inch. The shortest forming times and most consistent behavior were found when the stock was between 520° F. and 525° F. In this temperature range, 0.025 inch sheet was formed in four minutes; and 0.100 inch material in 34 minutes.

The variation of cycle time with thickness is consistent with the variation of stress with strain rate, as determined from torsion test. The torsion data also confirms that much faster cycle times can be endured by the metal and will result from the higher forming stresses that can be obtained by the introduction of positive pressure to supplement or replace the vacuum. Performance of the process at rates which are large compared with heat transfer considerations, completely eliminates the need for supplemental die heating. Also, short processing time minimizes equipment occupancy costs.

Additional heats of the same eutectoid zinc-aluminum alloy have been cast from commercial grade base metal yielding a 99.8% purity alloy. Vacuum forming results are almost identical with those from the 99.99% purity alloy that were originals employed.

(III)

Figure 6:
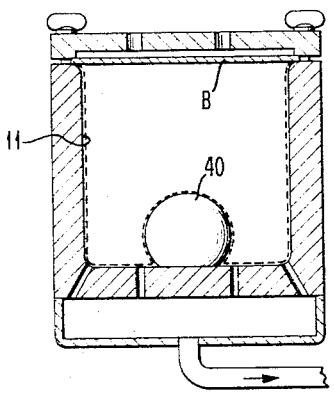
FIGURE 6 is a cross-sectional elevational view of apparatus like that shown in FIGURES 1 and 2 illustrating a more complex die shape.

Continuing the investigation of the most basic form of our discovery, we placed a male die surface or shaping member 40 in the cavity of the die 11 to create a configuration as shown in FIGURE 6. This additional die surface increased the total area change and added more complex curvatures. Quatitative examination readily indicated that completely successful parts were formed. Photographs of detailed parts formed in this manner and showing the ability and versatility of our process appear in the IBM Journal of Research and Development, volume No. 9, No. 2, pages 134–136, published April 1965.

(IV)

While extreme local increase in surface area demonstrates that an overall increase in area of greater than 1200% is possible if necessary to form a particularly complex part, such extreme local stretching is ordinarily not desirable. Local variations in stretching and consequent reduction of cross sectional thickness have been encountered in the polymer industry and several techniques have been developed to cause particular distributions of material to maintain a more uniform thickness.

Figure 7:
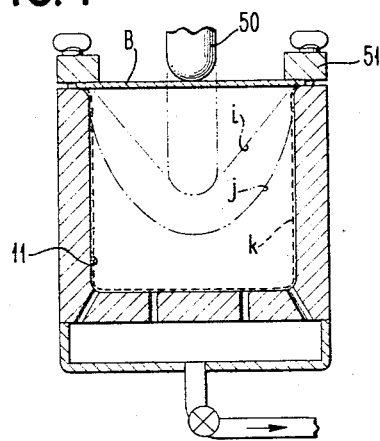
FIGURE 7 is a cross-sectional elevational view of apparatus similar to that shown in FIGURES 1 and 2, but including means for at least partially deforming the material by direct displacement rather than through a fluid interface.

Referring to FIGURE 7, we begin with the same equipment as illustrated in FIGURE 1 and added an arbor press (not shown) for driving a plug 50 in the form of a 2½" by 1" block rounded at its ends to a ½" radius and curved to a 1" radius on its lower edge. Prepared blank metal B having an initial thickness of 0.060" was placed in a clamping ring 51 and the plug 50 moved down 1" as shown by movement line $i$ to provide an initial stretch to the material. This initial stretch occurred principally in the side wall as frictional forces prevented significant displacement of the blank metal portion contacting the plug 50. After the initial stretch, vacuum was applied to the chamber, thus stretching the blank metal B through an intermediate position indicated by movement line $j$ and the part was thereafter pulled into intimate contact with the die surface 11 as shown by final position lines $k$. A scribed grid on the part indicated an overall more uniform area increase and a bottom wall thickness reduction of approximately 55%. The same part formed without the plug showed a bottom wall reduction in thickness of approximately 75%.

This test was repeated with the same equipment, but the blank was initially deformed by vacuum to produce a 1" sag. The plug was then forced 2" into the cavity of die body 10 and examination revealed a thickness decrease at the bottom wall of this finished part of only 36%.

(V)

Figure 8:
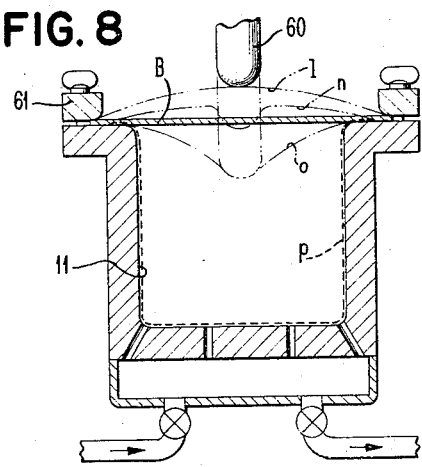
FIGURE 8 is a vertical cross-sectional view of apparatus somewhat similar to that shown in FIGURES 1 and 2, illustrating a billow technique of forming.

Another metal distributing technique, known in the polymer industry as billow forming, permits the preliminary development of increased cross-sectional area without interference from die walls. Referring to FIGURE 8, initial increase in cross-sectional area is developed by blowing blank metal B into a bulge out of the cavity 11 as indicated by movement line $l$. A plug 60 ordinarily is employed to guide the blank metal B back into the cavity (see movement line $n$ and $o$) where final forming is continued to completion into and against the die surface as indicated by final position $p$. Our qualitative investigation of this technique was performed using apparatus basically similar to that of FIGURE 8. Our die configuration, however, limited our investigation to a small initial periphery which reduces the effectiveness of this technique. As shown in FIGURE 8, an enlarged clamping ring 61 is provided to provide more material for the initial billow stretch. Our demonstration clearly showed that the material was completely handleable in the billow form, although the full metal distributing advantages of this technique could not be realized due to die limitations.

(VI)

Figure 9:
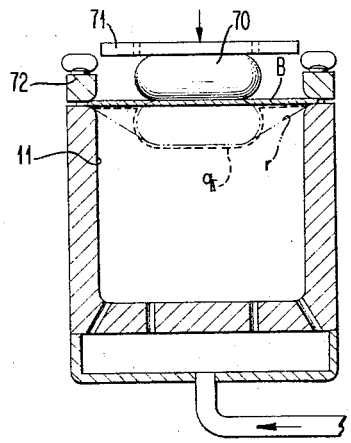
FIGURE 9 is a vertical cross-sectional view of apparatus similar to that shown in FIGURES 1 and 2, but illustrating a drape forming technique employing a male die having a complex curvature.

Another basic thermoforming technique is known as drape forming. We have demonstrated the ability of our process to employ the drape technique by using apparatus essentially like that shown in FIGURE 9. The drape technique employed involved the use of a male die surface or shaping member 70 having a reentrant portion to provide a severe test. The die surface 70 was mounted under a hold down plate 71 and blank metal B of prepared material (having an initial thickness of 0.030) was fixed in a clamping ring 72. The die surface 70 was then forced against the material providing an initial stretch and placing the die 70 actually within the cavity of die body 10 as shown by movement line $q$. The die surface 70 was then held in place while pressure at 40 p.s.i.g. was applied to the underside of the blank metal B causing the material to stretch and form upwardly around and into intimate contact with the die part 70 to a final position shown by broken line $r$. We noted a tendency for webs or folds to form in the area of the reentrant portion. However, this tendency is found to be readily controllable by the degree of initial deformation of the material.

In more specific terms, the material must never be stretched to the point that it has a larger surface area in a critical locality than the surface area of the corresponding local portion of the shaping member.

Our demonstrated ability to correct and avert this tendency indicates that webbing can be controlled by good design practice known in the plastics industry.

(VII)

Figure 10:
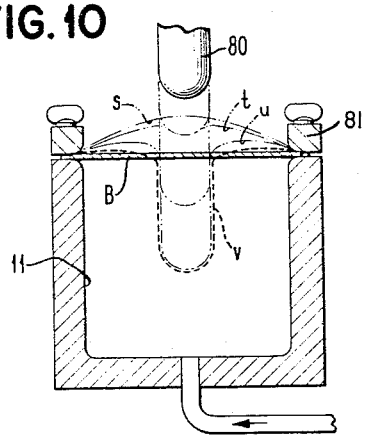
FIGURE 10 is a cross-sectional elevational view of apparatus similar to that shown in FIGURE 1, but employed to form upwardly around a male die member.

The apparatus of FIGURE 10 shows a typical complex severe forming process which employes a billow-plug technique and conclusively demonstrates, along with the other examples herein enumerated, the full application of our discovery to processes already developed in the polymer and glass industries. The object of the apparatus shown in FIGURE 10 was to form around the male die surface or shaping member 80 rather than around a male shape in the cavity of the female die surface 11. Prepared blank metal B was mounted in a clamping ring 81 and a billow or upwardly convex part was blown to develop initial surface area as shown by movement line $s$. The die surface 80 was then lowered into the billow while upward pressure was maintained. The combined movement and pressure stretched the blank metal around and into intimate contact with the die surface 80 as shown by movement lines $t$ and $u$, and final position line $v$. In forming around male parts using the billow-plug technique shown, we noted that proper operation requires a balance between plug movement and applied pressure to prevent webbing or corner folding caused by the material stretching faster than the die is ready to receive it.

(VIII)

The hypothesis of Backofen et al. supra placed strain rate sensitivity at a determining factor in the explanation of large amounts of tensile deformation without failure in metals. This hypothesis was based on geometrical analysis and a confirmation study of only the zinc-aluminum alloy which they discuss. Underwood supra indicated a number of other alloys having the ability to be extended to large amounts without deformation. To further confirm and extend the hypothesis of Backofen et al. we prepared a torsion sample of an alloy composed by weight of 67% aluminum and 33% copper (a reported hyperextensible alloy) by chill casting a bar to suppress an equilibrium eutectic type solidification. The test was conducted at a temperature just below the eutectic (i.e., melting) temperature. The test bar was machined into the standard torsion bar shape and tested at a variety of speeds while holding it at 1,000° F. (eutectic temperature for this alloy is approximately 1,020° F.). Strain rate sensitivity was measured by the techniques explained by Fields et al. supra for torsion speeds varying between limits of 0.5 to about 100 minutes$^{-1}$. Strain rate sensitivity values were found varying between extremes of 0.3 to 0.6.

It is thus possible to conclude that any material having an effective strain rate sensitivity will demonstrate hyperextensibility. Furthermore, from our discovery and demonstrations of our discovered process employing formation into intimate contact with various dies, it is possible to conclude that any material having an effective strain rate sensitivity is formable to some significant degree by the techniques described herein.

Those skilled in the art will recognize that the principles of our discovered process set forth above are useful either by themselves or in combination with conventional metal working processes. It will also be appreciated that various apparatus and pressure media can be employed, all withou departing from the spirit and scope of our discovery which is limited only by appended claims.

We claim:

1. In a method of making metallic forms, the improved process comprising the steps of:
    providing a shaping member having a surface formed complementary to the shape desired to be formed,
    providing blank metal having two opposed principal surfaces and being conditionable to exhibit effective strain rate sensitivity,
    conditioning said blank metal to exhibit its effective strain rate sensitivity,
    locating said blank metal with respect to said shaping member by positioning said blank metal with its principal opposed surfaces in operative projection with respect to said shaping member, and
    inducing tensile stress in said blank metal by applying a fluid pressure loading across said principal surfaces thereof, for a substantial period of time inversely related to the induced tensile stress, causing said blank metal to deform against, and into intimate contact with, said shaping member.

2. In a method of making metallic forms, the improved process comprising the steps of:
    providing a shaping member having a surface formed complementary to the shape desired to be formed,
    providing blank metal having two opposed principal surfaces and being conditionable to exhibit effective strain rate sensitivity,
    conditioning said blank metal to exhibit its effective strain rate sensitivity,
    locating said blank metal with respect to said shaping member by positioning said blank metal with its principal opposed surfaces in operative projection with respect to said shaping member and effectively constraining a closed periphery of said blank metal, circumscribing at least some surface portion thereof having an area smaller than the shaping member surface, and
    inducing tensile stress in the circumscribed portion of said blank metal by applying a fluid pressure loading across said principal surfaces for a substantial period of time inversely related to the induced tensile stress, whereby the circumscribed portion of said blank metal is caused to deform against, and into intimate contact with, said shaping member.

3. A method as defined in claim 2 wherein said blank metal is in the form of a sheet and said closed periphery comprises a single continuous edge.

4. A method as defined in claim 2 wherein said blank metal is in the form of a tube and said closed periphery comprises a pair of continuous edges.

5. A method as defined in claim 2 wherein said effective constraint of a closed periphery is accomplished by external clamping means, separate from friction constraint of said blank metal by said shaping member.

6. A method as defined in claim 2 wherein at least some part of said circumscribed surface portion is increased substantially in excess of 100% of its original area.

7. A method of making metal forms as defined in claim 1 wherein said effective strain rate sensitivity is at least 0.3.

8. In a method of making metallic forms, the improved process comprising the steps of:
provaging a vented shaping member having a surface formed complementary to the shape desired to be formed,
providing blank metal having two opposed principal surfaces and being conditionable to exhibit effective strain rate sensitivity,
conditioning said blank metal to exhibit its effective strain rate sensitivity,
locating at least a portion of said blank metal with respect to said shaping member by positioning said blank metal with a portion of its principal opposed surfaces in operative projection with respect to the vented portion of said shaping member, and
effectively constraining against movement with respect to said vented die portion, a closed periphery of said blank metal circumscribing at least some surface portion thereof, said closed periphery effectively encompassing, in projection, said vented die portion, and said circumscribed portion of said blank metal having an area smaller than the surface of said vented shaping member portion, and
inducing tensile stress in the circumscribed portion of said blank metal by applying a fluid pressure loading across said principal surfaces for a substantial period of time inversely relates to the induced tensile stress, causing said blank metal to deform against and into intimate contact with said vented shaping member.

9. A method as defined in claim 8 wherein said effective constraint of a closed periphery is accomplished by external clamping means, separate from friction constraint of blank metal by said shaping member.

10. In a method of making metallic forms, the improved process comprising the steps of:
providing a shaping member having a surface formed complementary to the shape desired to be formed, including at least principally a male shape,
providing blank metal having two opposed principal surfaces and conditioned to exhibit effective strain rate sensitivity, and
moving said blank metal relative to and against said shaping member while inducing tensile stress in said stock by applying a fluid pressure loading across said principal surfaces for a substantial period of time inversely related to the induced stress, causing said stock to deform, around, against, and into intimate contact with, said shaping member.

11. In a method of making metallic forms, the improved process comprising the steps of:
providing a shaping member having a surface formed complementary to the shape desired to be formed,
providing blank metal having two opposed principal surfaces and conditioned to exhibit effective strain rate sensitivity,
locating said blank metal with respect to said shaping member by positioning said blank metal with its principal opposed surfaces in operative projection with respect to said shaping member, and
inducing tensile stress in said blank metal by applying a fluid pressure loading across said principal surfaces thereof for a substantial period of time inversely related to the induced tensile stress, causing said blank metal to deform against, and into intimate contact with, said shaping member.

12. In a method of making metallic forms, the improved process comprising the steps of:
providing a vented die having a surface formed complementary to the shape desired to be formed,
providing blank metal having two opposed principal surfaces and being conditionable to exhibit effective strain rate sensitivity at elevated temperature,
heating said blank metal to an elevated temperature wherein it exhibits its substantial strain rate sensitivity,
locating said blank metal with respect to said shaping member by positioning said blank metal with its principal opposed surfaces in operative projection with respect to said shaping member and effectively constraining against movement with respect to said shaping member a closed periphery of said blank bounding at least some enclosed surface portion thereof having an area smaller than the shaping member surface, and
inducing tensile stress in the bounded portion of said blank by applying a uniform loading across said principle surfaces for a substantial period of time inversely related to the induced tensile stress, whereby the bounded portion of said blank is caused to deform against, and into intimate contact with, said shaping member.

13. In a method of making metallic forms, the improved process comprising the steps of:
providing blank metal of a composition of, by weight, approximately 78% zinc and 22% aluminum and formed to provide two opposed principal surfaces,
holding said blank metal at a temperature in excess of 600° F. at least one hour,
quenching said blank metal to a metastable state,
providing a shaping member having a surface formed complementary to the shape desired to be formed,
heating said blank metal to a temperature substantially between 500° F. and 520° F.,
positioning said blank metal with its opposed principal surfaces in operative projection with respect to said shaping member,
effectively constraining said blank metal about a closed periphery circumscribing at least some surface portion of said blank metal, and
inducing tensile stress in the circumscribed portion of said blank metal by applying transverse force thereto through a fluid interface for a substantial period of time inversely related to the induced tensile stress causing said blank to deform against and into intimate contact with said shaping member surface.

References Cited
UNITED STATES PATENTS

| | | | |
|---|---|---|---|
| 2,377,946 | 6/1945 | Leary | 18—19 |
| 2,728,317 | 12/1955 | Clevenger et al. | 72—60 |
| 3,171,014 | 2/1965 | Ducati | 219—149 |

DAVID L. RECK, *Primary Examiner.*

H. SAITO, *Assistant Examiner.*